May 2, 1967 R. A. DISCHERT ET AL 3,317,661
COLOR TELEVISION MODULATING SYSTEM
Filed April 3, 1964
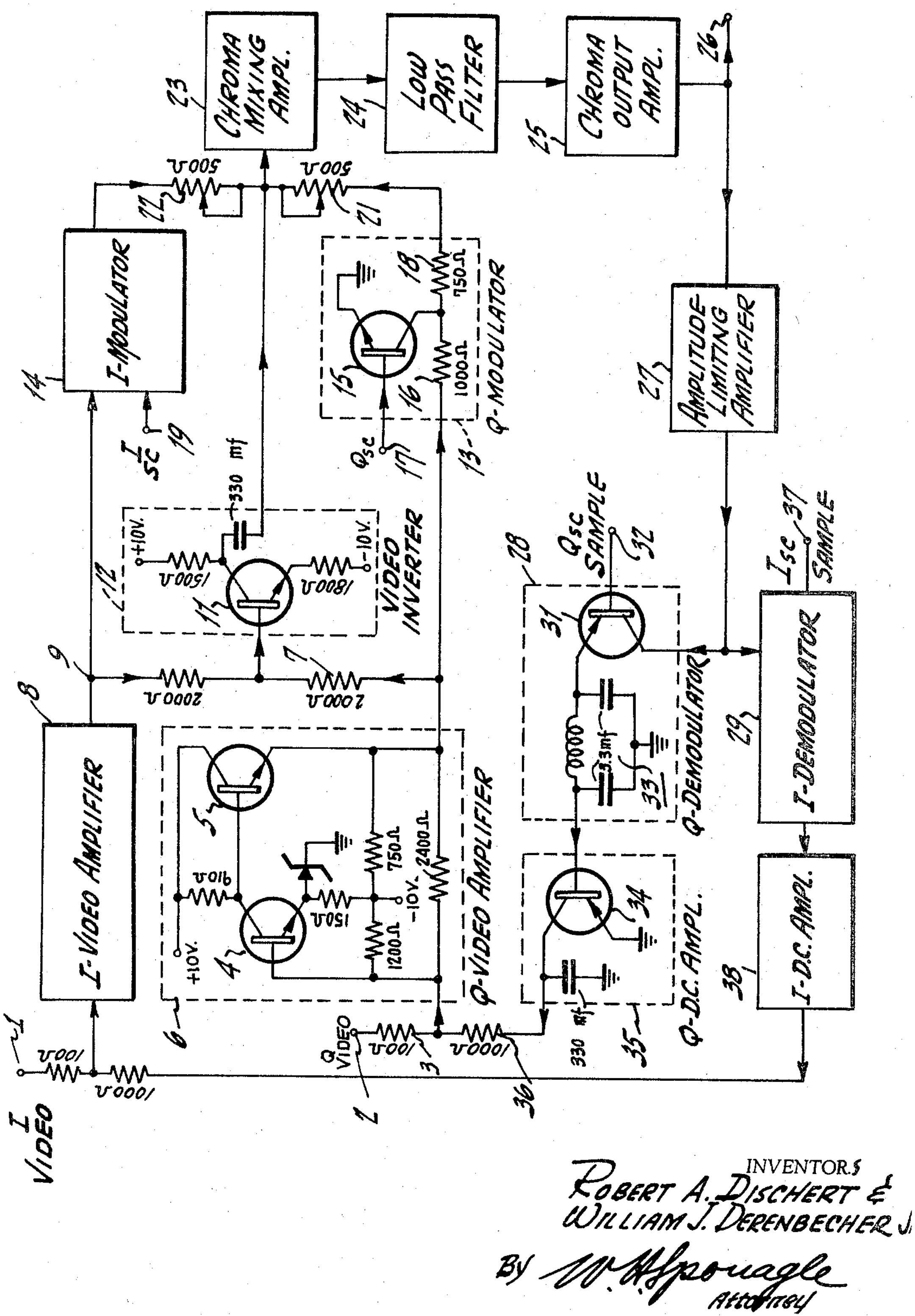
INVENTORS
ROBERT A. DISCHERT &
WILLIAM J. DERENBECHER JR.
BY W. H. Sprouagle
Attorney United States Patent Office 3,317,661
Patented May 2, 1967

3,317,661

COLOR TELEVISION MODULATING SYSTEM

Robert A. Dischert, Burlington Township, Burlington County, and William J. Derenbecher, Jr., Cherry Hill, N.J., assignors to Radio Corporation of America, a corporation of Delaware Filed Apr. 3, 1964, Ser. No. 357,043
5 Claims. (Cl. 178—5.4)

This invention relates to carrier wave modulating systems, and particularly to such systems for producing a modulated wave in which the carrier wave is suppressed and only the signal-modulated sidebands are present.

Such a modulated wave is required, for example, as the chrominance subcarrier wave in a color television system operating according to U.S. standards. In the chrominance subcarrier signal, the subcarrier wave is suppressed and, hence, not transmitted and only the subcarrier sidebands, which are phase- and amplitude-modulated by the chrominance intelligence, are transmitted. It has been a common practice to produce such a signal by using modulators which have been doubly balanced, i.e., for both the carrier wave and for the modulating signal. A doubly balanced modulator is not a simple device. It requires apparatus to produce opposite phases of the carrier wave and other apparatus to produce opposite polarities of the modulating signal, in addition to a pair of signal mixers or modulating devices for each carrier wave. In the case of a color television system using effectively a two-phase chrominance subcarrier wave, this apparatus must be duplicated for each of the two subcarrier wave phases.

It is an object of the present invention, therefore, to provide a relatively simple and inexpensive modulating system by which to produce a modulation output consisting only of the signal-modulated sidebands of a carrier wave without using the complicated balancing techniques of the prior art.

In accordance with a single-phase embodiment of the invention, a carrier wave controls the operation of a modulator circuit to which the modulating signal and the carrier wave are applied to produce in the output circuit modulating products to which an inverted polarity version of the modulating signal is added in such amplitude as to eliminate the modulating signal component from the resultant signal. Any unmodulated trace of the carrier wave present in the resultant signal is detected to produce a unidirectional control signal which is combined with the modulating signal in such amplitude as to eliminate the unmodulated carrier signal from the modulator output.

The invention, as used in a color television embodiment illustratively disclosed herein, employs two such modulators in which carrier waves each having the same frequency but having a quadrature phase relationship to one another are modulated with two color difference signals. The modulation products derived from the two modulators are combined to produce a single phase- and amplitude-modulated wave for transmission. In such a system a single amplitude inverter stage is used for the two color difference signals for the purpose of eliminating the modulating components from the modulation products produced by the two modulators. A sample of the output from the modulators, taken during a no-signal period, is phase-detected at both of the quadrature modulating phases to produce respective unidirectional signals representative of the quadrature components of any residual unmodulated carrier wave. These unidirectional signals are combined respectively with the video signals for the purpose of eliminating any trace of the carrier wave from the output of the apparatus.

The single figure of the drawing represents, partly in block and partly in schematic form, an embodiment of the invention as used in a color television system operating according to U.S. standards.

The signals derived from the image pickup device or camera will be understood to have been matrixed according to commonly used practices to produce the so-called I and Q color difference signals which are available at terminals 1 and 2, respectively. Certain parts of the modulating apparatus are the same in both of the I and Q channels. Other apparatus is common to the two channels. In the interest of simplicity the apparatus of only one channel which is duplicated in the other is shown in detail. Also, any apparatus that is common to the two channels is shown in detail as employed in one successfully operated embodiment of the invention. For the purposes of the following description the apparatus for the Q channel only is shown in detail. It will be understood that similar apparatus is provided in the I channel and operates in a similar manner.

The Q signal at terminal 2 is impressed by a circuit including a series resistor 3 upon the base electrode circuit of an input transistor 4 which with an output transistor 5 comprises a feedback pair of amplifiers for the Q video signal amplifier 6. The amplified Q video signal derived from the emitter electrode of the output transistor 5 is combined through a series resistor 7 with a similarly amplified I video signal amplifier 8 and supplied through a series resistor 9. The two video signals which are added together in this manner are applied to the base electrode of a transistor 11 comprising a video signal polarity inverter 12, the inverted output signal from which is developed at the collector electrode of this transistor to be used in a manner to be described presently.

The Q and I video signals derived from the respective amplifiers 6 and 8 are applied to Q and I modulators 13 and 14 respectively. The Q modulator includes a transistor 15 used as a bi-directional switch for the Q video signal impressed upon its collector electrode through a series resistor 16. The transistor 15 is controlled by a Q phase of the color subcarrier wave having a frequency of approximately 3.58 megacycles per second which is available at terminal 17. The Q subcarrier wave is impressed upon the base electrode of the transistor 15, the circuits for which are arranged so that in one-half of the cycle of the subcarier wave the transistor is switched well into current saturation and during the opposite phase of the subcarrier wave is switched to complete cut off thereby rendering the modulator independent of signal variations and/or transistor characteristics. The Q signal modulated subcarrier wave derived from the collector electrode of transistor 15 through a series resistor 18 comprises oppositely phased sidebands of the Q subcarrier wave modulated in amplitude in accordance with the Q video signal. The operation of the I modulator 14 is similar in response to an I phase of the subcarrier wave available at terminal 19. The Q and I phases of the subcarrier wave available at terminals 17 and 19, respectively, have a quadrature phase relationship to one another.

The Q and I modulated subcarrier waves derived respectively from the Q and I modulators 13 and 14 are combined with one another respectively through variable resistors 21 and 22 for impression upon the input circuit of a chroma mixing amplifier 23 in which the Q and I modulated subcarrier waves are combined to produce a single phase- and amplitude-modulated subcarrier wave.

The combined and inverted polarity video signals derived from the inverter 12 are impressed upon the junction point of the variable resistors 21 and 22. By means of a suitable adjustment of the resistor 21 enough of the Q video modulating signal is combined in opposite polarity with the Q video signal modulated subcarrier wave to effectively eliminate the Q modulating signal from the output of the Q modulator 13. Thus, only the Q signal modulated sidebands of the Q phase of the subcarrier wave are present at the input of the chroma mixing amplifier 23. In a similar manner a suitable adjustment of the variable resistor 22 effectively eliminates the I modulating signal from the modulation products derived from the I modulator 14, leaving essentially only the I signal modulated sidebands of the I phase of the subcarrier wave for impression upon the chroma mixing amplifier 23.

The phase- and amplitude-modulated carrier wave derived from the chroma mixing amplifier 23 is impressed upon a low pass filter 24 which has a pass band characteristic which is essentially flat from zero frequency to about 3.58 megacycles and its response is essentially zero at approximately 7 megacycles. By such means all undesired frequencies are eliminated including harmonics of the subcarrier wave which necessarily are developed by reason of the described operation of the modulators 13 and 14. The output from the low pass filter 24, therefore, includes only the desired signal effects comprising the signal modulated sidebands of the subcarrier wave. Such a signal is impressed upon a chroma output amplifier 25 for suitable amplification and impression upon an output terminal 26 from which the signal is available for delivery to utilization apparatus not involved in the present invention.

A sample of the signal delivered to the output terminal 26 is taken during a period in which there is no video signal of the subcarrier such as during horizontal blanking intervals, for example. Such a signal is impressed upon an amplitude limiting amplifier 27 for delivery to a circuit for detecting the phase and amplitude of any unmodulated traces of the subcarrier wave which may be present in the signal applied to the output terminal 26. Such a trace of the subcarrier wave may have any phase but, by reason of the quadrature phase relationship between the I and Q subcarrier waves, any residual trace of the subcarrier wave may be resolved into quadrature components respectively in phase with the I and Q subcarrier wave phases.

The output from the amplitude limiting amplifier 27 is impressed upon Q and I demodulators 28 and 29 respectively. In the case of the Q demodulator the signal from the amplifier 27 is applied to the collector electrode of a transistor 31 which is operated as a switch under the control of a sample of the Q subcarrier wave available at a terminal 32 connected to the base electrode of the transistor. The component of any residual trace of the subcarrier wave having the Q subcarrier wave phase is detected by the demodulator 28 which produces at its emitter electrode a signal representative of the magnitude of such a component which is filtered by a network 33 to produce a substantially unidirectional signal also representative of the magnitude of the Q phase component of the subcarrier wave trace. This unidirectional signal is impressed upon a transistor 34 of a Q D.C. amplifier 35 for suitable amplification to produce a unidirectional control signal. This control signal is impressed upon a series resistor 36 which is connected to the video signal input resistor 3 so as to add a D.C. component to the Q video signal. The Q video signal which is derived from the amplifier 6 is so modified by the added D.C. component that its impression upon the Q modulator 13 produces a modulated carrier wave in the output of the modulator of such a character as to produce a Q phase component of the subcarrier wave which is effective to cancel or eliminate the undesired Q phase component of the residual subcarrier wave trace found in the output signal applied to the terminal 26.

In a similar manner the signal derived from the amplifier 27 and impressed upon the I demodulator is subjected to demodulation under the control of a sample of the I subcarrier wave available at terminal 37 to produce a unidirectional control signal representative of the I phase component of any residual trace of the subcarrier wave found in the signal applied to the output terminal 26. Such a signal after amplification in an I D.C. amplifier 38 is added in a manner similar to that described to the I video signal impressed upon the video amplifier 8. By such means a D.C. component is added to the I video signal which is impressed upon the modulator 14 so as to cancel or eliminate the I phase component of the residual trace of the subcarrier wave from the output signal.

The resultant signal produced at the output terminal 26, thus, contains only the signal modulated sidebands of the subcarrier wave and both the subcarrier wave itself and the video modulating signal are eliminated without resorting to the use of any of the relatively complicated balancing techniques and apparatus of the prior art.

What is claimed is:

1. In a modulating system, the combination comprising:

a source of an intelligence signal;

a source of a carrier wave;

a modulator;

means for applying said intelligence signal and said carrier wave to said modulator to develop modulation products including said intelligence signal, two sets of oppositely phased sidebands of said carrier wave, and possibly an unmodulated trace of said carrier wave;

means for combining said intelligence signal in inverted polarity with said modulation products in such manner as to eliminate said intelligence signal from said modulation products;

means responsive to unmodulated traces of said carrier wave to produce a representative unidirectional control signal; and means for combining said control signal with said intelligence signal to eliminate said unmodulated traces of said carrier wave from said modulation products.

2. In a modulating system, the combination comprising:

sources of first and second independent intelligence signals;

sources of first and second carrier waves having the same frequency and quadrature related phases;

first and second modulators;

means for applying said first and second intelligence signals to said respective modulators;

means for applying said first and second carrier waves to said respective modulators to develop in the output of each modulator modulation products including said applied intelligence signal, two sets of oppositely phased sidebands of said applied carrier wave, and possibly an unmodulated trace of said carrier wave, the two sets of sidebands developed by said first modulator being in phase quadrature relationship to the two corresponding sets of sidebands developed by said second modulator;

means for combining selected amplitudes of said intelligence signals in inverted polarity respectively with the modulation products of said first and second modulators in such manner as to eliminate said first and second intelligence signals from said modulation products;

means for combining the modulation products of said first and second modulators to produce a single phase- and amplitude-modulated wave for delivery to utilization apparatus;

means coupled to receive said modulated wave for producing control signals respectively representative of any unmodulated traces of either or both of said carrier waves; and means for adding said respective control signals as directed current components to the intelligence signal associated with the detected unmodulated carrier wave, thereby to eliminate any unmodulated carrier wave components from said phase- and amplitude-modulated wave delivered to said utilization apparatus.

3. In a modulating system, the combination comprising:

sources of first and second independent intelligence signals;

sources of first and second carrier waves having the same frequency and quadrature related phases;

first and second modulators, each including a transistor;

means for applying said first and second intelligence signals to said respective transistors;

means for applying said first and second carrier waves to said respective transistors to operate said transistors as bi-directional switches for said first and second intelligence signals respectively, thereby to develop in the output of each modulator modulation products including said applied intelligence signal, two sets of oppositely phased sidebands of said applied carrier wave, and possibly an unmodulated trace of said carrier wave, the two sets of sidebands developed by said first modulator being in phase quadrature relationship to the two corresponding sets of sidebands developed by said second modulator;

means for combining selected amplitudes of said intelligence signals in inverted polarity respectively with the modulation products of said first and second modulators in such manner as to eliminate said first and second intelligence signals from said modulation products;

means for combining the modulation products of said first and second modulators to produce a single phase- and amplitude-modulated wave for delivery to utilization apparatus;

means coupled to receive said modulated wave for producing control signals respectively representative of any unmodulated traces of either or both of said carrier waves; and means for adding said respective control signals as direct current components to the intelligence signal associated with the detected unmodulated carrier wave, thereby to eliminate any unmodulated carrier wave components from said phase- and amplitude-modulated wave delivered to said utilization apparatus.

4. In a modulating system, the combination comprising:

sources of first and second independent intelligence signals;

sources of first and second carrier waves having the same frequency and quadrature related phases;

first and second modulators, each including a transistor;

means for applying said first and second intelligence signals to said respective transistors;

means for applying said first and second carrier waves to said respective transistors to operate said transistors as bi-directional switches for said first and second intelligence signals respectively, thereby to develop in the output of each modulator modulation products including said applied intelligence signal, two sets of oppositely phased sidebands of said applied carrier wave, and possibly an unmodulated trace of said carrier wave, the two sets of sidebands developed by said first modulator being in phase quadrature relationship to the two corresponding sets of sidebands developed by said second modulator;

means for inverting the polarity of said respective intelligence signals;

means for combining selected amplitudes of said intelligence signals of inverted polarity respectively with the modulation products of said first and second modulators, said selected amplitudes being such as to eliminate said first and second intelligence signals from said modulation products;

means for combining the modulation products of said first and second modulators to produce a single phase- and amplitude-modulated wave for delivery to utilization apparatus;

means coupled to receive said modulated wave for producing control signals respectively representative of any unmodulated traces of either or both of said carrier waves; and means for adding said respective control signals as direct current components to the intelligence signal associated with the detected unmodulated carrier wave, thereby to eliminate any unmodulated carrier wave components from said phase- and amplitude-modulated wave delivered to said utilization apparatus.

5. In a modulating system, the combination comprising:

sources of first and second independent intelligence signals;

sources of first and second carirer waves having the same frequency and quadrature related phases;

first and second modulators, each including a transistor;

means for applying said first and second intelligence signals to said respective transistors;

means for applying said first and second carrier waves to said respective transistors to operate said transistors as bi-directional switches for said first and second intelligence signals respectively, thereby to develop in the output of each modulator modulation products including said applied intelligence signal, two sets of oppositely phase sidebands of said applied carrier wave, and possibly an unmodulated trace of said carrier wave, the two sets of sidebands developed by said first modulator being in phase quadrature relationship to the two corresponding sets of sidebands developed by said second modulator;

means for combining said first and second intelligence signals;

means for inverting the polarity of said combined intelligence signals;

means for combining selected amplitudes of said combined intelligence signals of inverted polarity respectively with the modulation products of said first and second modulators, said selected amplitudes being such as to eliminate said first and second intelligence signals from said modulation products;

means for combining the modulation products of said first and second modulators to produce a single phase- and amplitude-modulated wave for delivery to utilization apparatus;

means coupled to receive said modulated wave for detecting any unmodulated traces of either or both of said carrier waves and for producing control signals respectively representative of said unmodulated carrier wave traces; and means for adding said respective control signals as direct current components to the intelligence signal associated with the detected unmodulated carrier wave, thereby to eliminate any unmodulated carrier wave components from said phase- and amplitude-modulated wave delivered to said utilization apparatus.

References Cited by the Examiner

UNITED STATES PATENTS 2,835,730 5/1958 McMann et al. ------ 178—5.4

OTHER REFERENCES

Black, Modulation Theory, Van Nostrand, Princeton, N.J., 1962, pp. 251–255.

DAVID G. REDINBAUGH, *Primary Examiner.*

J. A. O'BRIEN, *Assistant Examiner.*